(12) United States Patent
Chuang

(10) Patent No.: US 8,600,342 B2
(45) Date of Patent: Dec. 3, 2013

(54) EMERGENCY MESSAGES AND THEIR VARIOUS ASPECTS

(75) Inventor: Chang-Shan Chuang, Taipei (TW)

(73) Assignee: Chii Yang Co., Ltd., Taipei (TW)

(*) Notice: Subject to any disclaimer, the term of this patent is extended or adjusted under 35 U.S.C. 154(b) by 221 days.

(21) Appl. No.: 12/691,825

(22) Filed: Jan. 22, 2010

(65) Prior Publication Data

US 2013/0122850 A1 May 16, 2013

(30) Foreign Application Priority Data

Jan. 22, 2009 (TW) ............................... 98102679 A

(51) Int. Cl.
*H04M 11/04* (2006.01)
*H04W 24/00* (2009.01)
*H04B 7/00* (2006.01)

(52) U.S. Cl.
USPC .................. 455/404.2; 455/456.2; 455/456.6; 455/521; 701/515

(58) Field of Classification Search
USPC .......... 455/404.1, 404.2, 414.1, 414.2, 414.3, 455/414.4, 456.1, 456.2, 456.3, 456.4, 455/456.5, 456.6, 457, 521; 701/400–541; 342/357.2–358, 450–465; 340/988–996
See application file for complete search history.

(56) References Cited

U.S. PATENT DOCUMENTS

| 5,742,666 | A | * | 4/1998 | Alpert | 455/404.2 |
| 7,286,648 | B1 | * | 10/2007 | Chang et al. | 379/45 |
| 2004/0203622 | A1 | * | 10/2004 | Esque et al. | 455/412.1 |
| 2010/0227582 | A1 | * | 9/2010 | Berry et al. | 455/404.1 |

FOREIGN PATENT DOCUMENTS

| CN | 200979595 Y | 11/2007 |
| TW | 200518572 A | 6/2005 |
| TW | M300815 | 11/2006 |
| TW | I267650 | 12/2006 |

OTHER PUBLICATIONS

Search Report issued for related Taiwanese Patent Application No. 098102679, dated Aug. 22, 2012, and its English translation provided the clients.

* cited by examiner

*Primary Examiner* — Marisol Figueroa
*Assistant Examiner* — Erica Navar
(74) *Attorney, Agent, or Firm* — Ladas & Parry, LLP

(57) ABSTRACT

This invention provides a means of sending emergency messages. When in the state of emergency, the user activates or initiates a communication device to execute the positioning procedure. The communication device, converts the current location into a text or voice message and delivers the text or voice message to at least one person on the contact list that is preset in the communication device. By using this invention, the amount of electricity consumption is low therefore charges last longer, the cost decreases, and the user does not experience the pressure of being traced.

22 Claims, 4 Drawing Sheets

EMERGENCY MESSAGES AND THEIR VARIOUS ASPECTS

BACKGROUND OF THE INVENTION

1. Field of the Invention

The invention provides a means for communicating, locating, notifying assistance, and dispatching rescue, in relation to an emergency situation.

2. Description of the Related Art

In the conventional emergency communication system, the user sends an emergency signal to a security company through an emergency communication device when facing an urgent situation. Based on the signal, the security company then determines the origin of the emergency signal and sends security personnel to the signal source location to handle the emergency. However, since this emergency service is provided by the security company, the cost is high.

Moreover, the device is in the working mode constantly and consumes electricity continuously, and so must be charged frequently by the user. Products available in the market today generally require daily charges, particularly children and the elderly are the people who most likely need this type of service yet may be more likely to fail to charge regularly. When the charging of the device is forgotten then it is most likely that the communication device will not be functional in the case of emergency. The main purpose of the current invention is, as noted above, to minimize the uncharged state of the device, as well as to achieve reductions in the electricity consumption, the frequency of charge, and the cost.

CONTENT OF THE INVENTION

To eliminate that significant flaw of traditional design, the current invention demonstrates a method that can decrease electricity consumption and cost. According to an example of application, this invention provides means of communicating about emergency situation device. The communication device includes: as an example of a means to activates the positioning procedure of the communication device; a positioning unit that responds to the execution of the positioning procedure after the emergency button is pressed and determines the position of the communication device; a converting unit that converts the position of the communication device into a text or voice message; and a delivering unit that delivers the text or voice message to at least one person on the contact list that is preset in the communication device.

Another example of an application provides a communication host. The communication host includes: a receiving device that receives the emergency message produced by the positioning procedure of the communication device; a converting unit that converts the emergency message into a text or voice message; and a dispatch device that delivers the text or voice message to at least one person on the contact list that is preset in the communication device.

Another aspect of the invention provides an electronically or machine readable recordable medium. The medium is read by the communication device and carries out the following sequence: when in the state of emergency, the user activates the execution of the positioning procedure. The communication device then converts the current location into a text or voice message and delivers the text or voice message to at least one person on the contact list that is preset in the communication device. The medium is preferably readable, and optionally recordable.

Further aspect of the current invention provides an electronically or machine recordable/readable medium. The medium is read by the communication host and carries out the following sequence: an emergency message produced by the positioning procedure of the communication device is received. Next, the emergency message is converted into a text or voice message. The text or voice message then is delivered to at least one person on the contact list that is preset in the communication device.

Another case of the current invention provides a method of sending emergency messages. When in the state of emergency, the user activates the communication device, which may be, for example, by the simple convenience of "pressing", or "depressing" the emergency button of the communication device to execute the positioning procedure. The communication device then converts the current location into a text or voice message and delivers the text or voice message to at least one person on the contact list that is preset in the communication device.

Another case of application provides a method of sending emergency messages. An emergency message produced by the positioning procedure of the communication device is received. Next, the emergency message is converted into a text or voice message. The text or voice message then is delivered to at least one person on the contact list that is preset in the communication device.

Utilizing any method based on the current invention, the consumption of electricity is reduced, the frequency of charge is reduced, and the cost to the user is decreased. Likelihood of failure to keep the state of charge for the device current, is minimized by making a regular charging schedule possible.

[Application Method]

FIG. 1 shows the process-flow procedure chart of the method of sending emergency messages created by the application of the current invention. When in the state of emergency, the user activates or initiates the communication device (Step S11). Since the communication device is normally on stand-by mode, the device will enter working mode from stand-by mode. This setup decreases the electricity consumption of the communication device, and it does not need to be charged as often. The communication device then executes the positioning procedure (Step S13). After the communication device successfully performs the positioning procedure, it converts the current location into a text or voice message (Step S17) and delivers the text or voice message to at least one person on the contact list that is preset in the communication device (Step S18).

In another case of application of this invention, after the user activates, or initiates, the emergency notification system; which may be as facilitative as executing a series of keystrokes, or even simply pressing "an emergency button"; the communication device produces a noticeable signal, such as an alarm, which may be auditory, visual, palpable, or combinations thereof; to attract the attention of others (Step S12). Next, the communication device executes the positioning procedure with an outdoor positioning system and then determines if it can perform the positioning with an outdoor positioning system (Step S13). The outdoor positioning system can be any dependable and available positioning system including, for example, Global Positioning System, or GPS. However, this invention is not limited to GPS, other outdoor positioning systems (Step S14) such as Assisted Global Positioning System, or AGPS, can be used as well. Moreover, this invention can use other indoor positioning systems or various positioning systems such as Base Station Positioning System or Radio-Frequency Identification System (RFID). If the communication device determines the location successfully with either an outdoor or indoor positioning system, it then converts the current location into a text or voice message (Step S17), and the text or voice message contains the location information such as address, crossroads, and intersections.

According to another case of application of this invention, the text or voice message may include preset contents of communication such as names, origins of incidents, times, and etc.

According to another case of application of this invention, the text or voice message is delivered to at least one person on the contact list that is preset in the communication device (Step S18). The text or voice message can be delivered to a preset number of contacts in a preset order or preset cycle. Furthermore, as noted before, after pressing the emergency button, the communication device produces a noticeable signal such as alarm. When a phone call is received, the communication device will stop the signal and switch to the normal phone function, which may be called ringtone or talk mode (Step S19). If the communication device cannot determine the location with an outdoor or indoor positioning system, the communication device will decide if the user turns off the device in a set period of time (Step S15). If the communication device is not turned off, the communication device will continue to produces a noticeable signal such as audible. When a phone call is received, the communication device will stop the noticeable signal such as alarm and switch to the phone ringtone or talk mode (Step S16). In this case of application, the communication device is a receive-send device, including a cellular phone.

According to another case of application, when the communication device cannot determine the location and if the user does not turn off the communication device in a set period of time, the communication device will deliver a text or voice message to at least one person on the contact list that is preset in the communication device to a preset number of contacts in a preset order or preset cycle, produce a noticeable signal such as auditory, or switch to talk mode.

According to another case of application that describes the method of sending emergency messages, the communication host receives the emergency message produced by the positioning procedure of the communication device, converts the emergency message into a text or voice message, and delivers the text or voice message to at least one person on the contact list that is preset in the communication host.

In this case of application, the communication host is located in a control room of the telecommunication, internet, and centralized computing functions company, and therefore the structure of the communication device on'hand is simplified. Similarly, the text or voice message may include preset contents of communication, and also the communication host can deliver the text or voice message to a preset number of contacts in a preset order or preset cycle.

FIG. 2 shows the process flow chart of the method of delivering the text or voice messages created by the application the current invention. After the communication device sends out the emergency message or after the communication host receives the emergency message, the communication device or the communication host will automatically dial the $i^{th}$ phone number (i=1 at this time) (Step S21), and the communication device or the communication host will determine if the phone call is connected (Step S22). If the phone call is connected, the communication device or the communication host will deliver the text or voice message to the certain contact (Step S23). The communication device or the communication host will determine if the number of phone calls connected exceeds the preset number of N contacts (Step S25), and if the number has not exceeds N, then the formula of i=i+1 will be carried out (Step S24). The procedure goes back to Step S21, and the communication device or the communication host dials the phone number of the next contact. The process repeats as described until the number of connected calls meets the preset number of contacts.

According to another case of application of this invention, the communication device or the communication host can deliver the text message directly to contacts. The communication device or the communication host sends the message out to at least one contact on the list in a preset cycle.

FIG. 3 shows the communication device (30) created by an application of the current invention. The communication device includes an emergency button (31), a positioning unit (32), a converting unit (35), and a delivering unit (37). The emergency button (31) activates the positioning procedure of the communication device when the user presses the button. The positioning unit (32) responds to the execution of the positioning procedure after the emergency button is pressed and determines the position of the communication device (30), which is the same as the position of the user. The converting unit (35) converts the position of the communication (30) device into a text or voice message. The delivering unit (37) delivers the text or voice message to at least one person on the contact list that is preset in the communication device (30).

In another case of application of this invention, the positioning unit (32) includes a GPS positioning unit (33) and a AGPS positioning unit (34). This invention is not limited to GPS or AGPS, and the positioning system can be other types of positioning units.

In another case of application of this invention, the communication device includes a signal unit (38). The signal unit (38) produces a noticeable signal such as vibratory, or when a phone call is received, it stops the signal and switches to talk mode. In addition, the communication device includes a reading unit (36). The reading unit (36) reads the recordable medium to execute the method of sending emergency messages described above.

FIG. 4 shows the communication host (40) created by an application of the current invention. In this case of application, the communication host is located in a control room of the telecommunication, interne, and centralized computing functions company, and therefore the structure of the communication device on hand is simplified. Similarly, the communication host includes a receiving device (41), a converting unit (42), and a dispatch device (44). The receiving device (41) receives the emergency message produced by the positioning procedure of the communication device. The converting unit (42) converts the emergency message into a text or voice message. The dispatch device (44) delivers the text or voice message to at least one person on the contact list that is preset in the communication device. Similarly, the text or voice message may include preset contents of communication, and also the communication host (40) can deliver the text or voice message to a preset number of contacts in a preset order or preset cycle.

In another case of application of this invention, the communication device (40) includes a reading unit (43). The reading unit (43) reads the recordable medium to execute the method of sending emergency messages described above.

According to another case of application, the current invention provides an electronically or machine readable/recordable medium. The medium is read by the communication device (30) and carries out the following sequence: (1) when in the state of emergency, the user presses the emergency button (31) of the communication device (30) to execute the positioning procedure. (2) The communication device (30) then converts the current location into a text or voice message and (3) delivers the text or voice message to at least one person on the contact list that is preset in the communication device (30).

According to another case of application, the current invention provides an electronically or machine recordable readable medium. The medium is read by the communication host (40) and carries out the following sequence: an emergency message produced by the positioning procedure of the communication device (30) is received. Next, the emergency message is converted into a text or voice message. The text or voice message then is delivered to at least one person on the contact list that is preset in the communication device.

The method of sending emergency messages described above can be completed by instructions that are executed by electronic or machine-processible programs. The instructions can be loaded into an electronic or other types of programmable information processers which execute the method of sending emergency messages. The instructions can be stored in an electronically or machine recordable/readable medium (for example, magnetic tape, disk, CD, hard disk drive, IC memory, PC RAM, and other functional readable recordable media), and the medium can be loaded into electronics or machines for the application of the instructions.

The advantages of the current invention include: (1) the communication device is normally on stand-by mode and only enters working mode after the emergency button is pressed. Therefore, the consumption of electricity is reduced, and the frequency of charge by the user is decreased. (2) The text or voice message can be sent by the communication device or the communication host. As a result of direct delivery of the text or voice message by the communication device or the communication host to the contacts, the process does not have to go through a security company and reduces cost to the user. Moreover, after the contacts receives the message, the current position of the one who presses the emergency button and other preset messages are identified and learned immediately. (3) The communication device based on the current invention is only activated in the case of emergency, so the user who carries such device does not experience the pressure of being traced.

Although the technical contents and characteristics of the current invention are well illustrated above, based on the core principle of the current invention, many changes and modifications can be made to the technology of the current invention by those with common trade knowledge in the related technical field. Therefore, the scope of the current invention is not limited to the cases of applications demonstrated, but it also includes changes and modifications that can be made based on the principle of the current invention and are covered by all the fields of any patent to be applied for.

BRIEF DESCRIPTIONS OF FIGURES

DESCRIPTIONS OF FUNCTIONAL MAIN COMPONENTS

Figure 1:
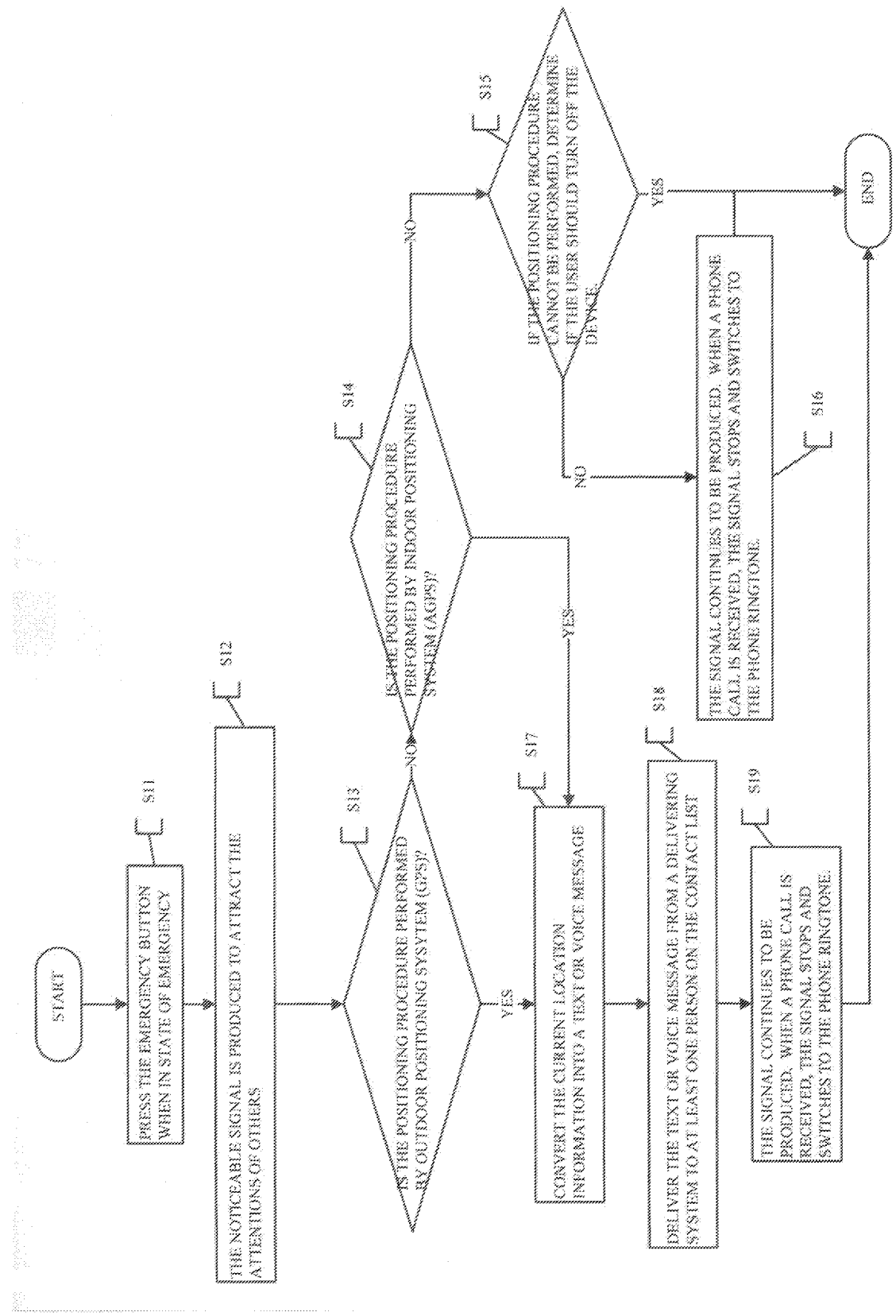
FIG. 1 illustrates a global view of the Process flow chart which is followed by the method of sending emergency messages created by the application the current invention.
Figure 2:
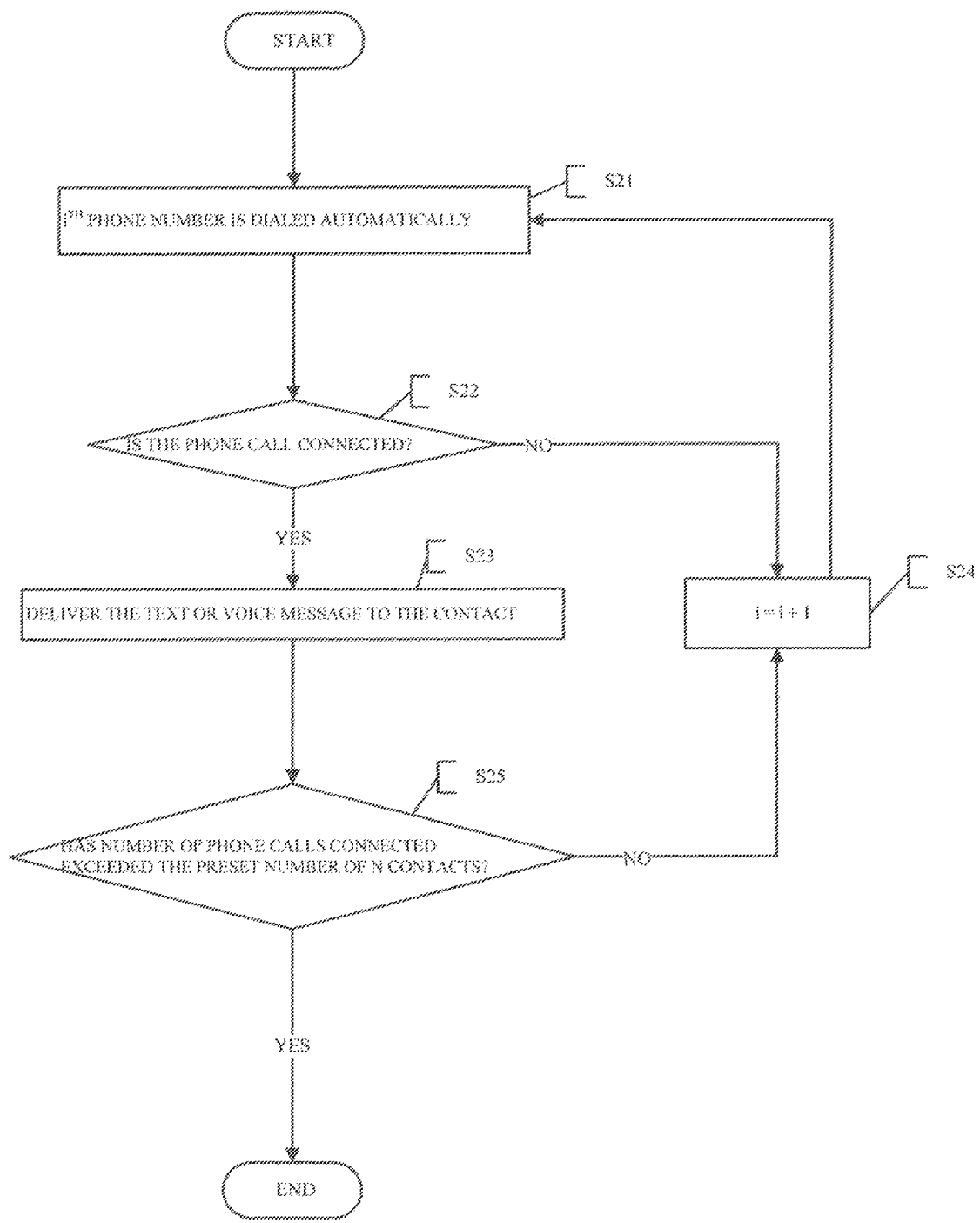
FIG. 2 illustrates the flow procedure chart of the method of sending the text or voice messages created by the application the current invention.
Figure 3:
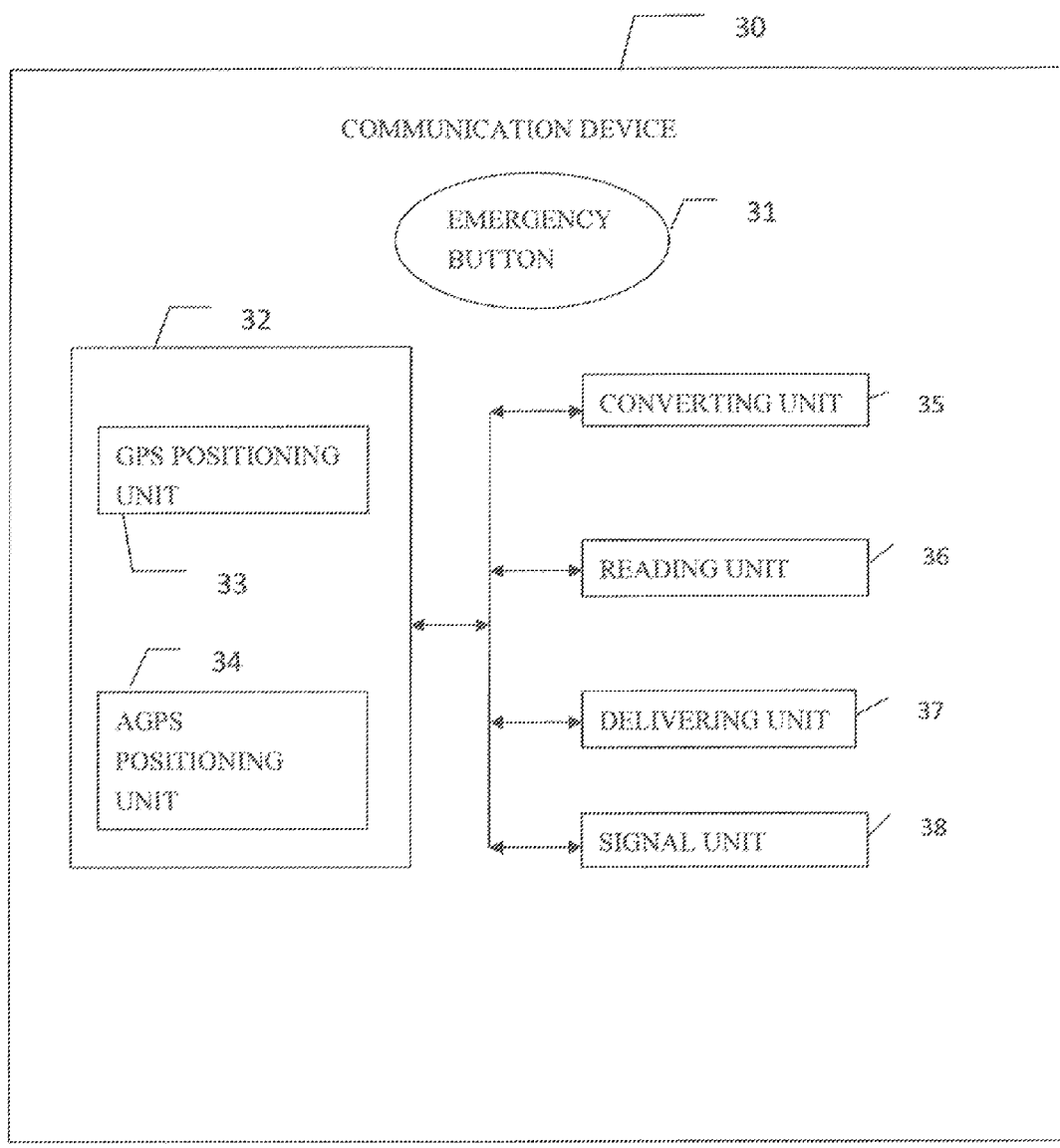
FIG. 3 illustrates the communication device created by an application of the current invention.
Figure 4:
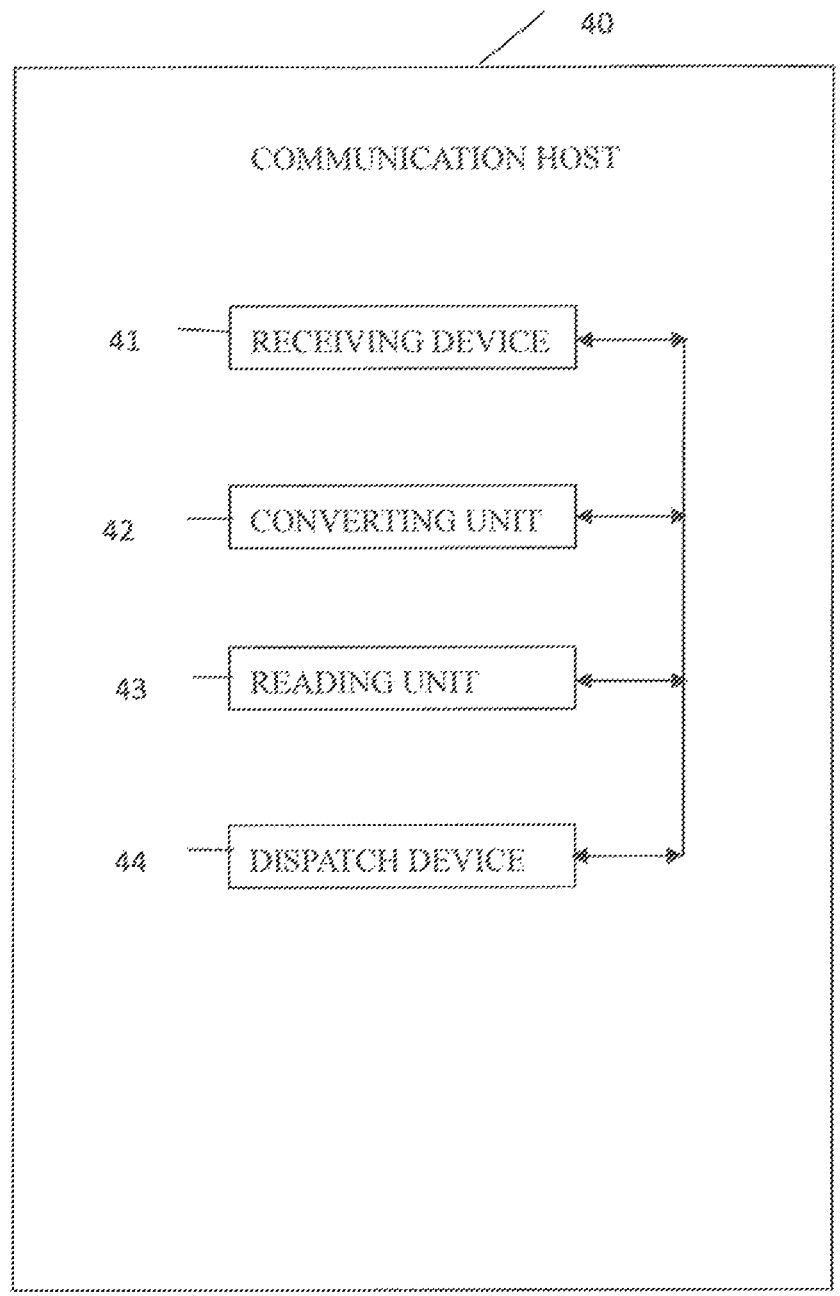
FIG. 4 illustrates the communication host created by an application of the current invention.

30: Communication Device
31: Emergency Button
32: Positioning Unit
33: GPS Positioning Unit
34: AGPS Positioning Unit
35 and 42: Converting Unit
36 and 43: Reading Unit
37: Delivering Unit
38: Signal Unit
40: Communication Host
41: Receiving Device
44. Dispatch Device

The invention claimed is:

1. A communication device, which includes: an emergency activation system which, when, initiated by a user, activates a positioning procedure of the communication device; a positioning unit that responds to the activity of the positioning procedure and determines a position of the communication device; a converting unit that converts the position of the communication device into a text or voice message; and a delivering unit that delivers the text or voice message to at least one person on a contact list that is preset in the communication device;
    wherein when the communication device cannot determine the location and the communication device is not turned off in a set period of time, the communication device will continue to produce a noticeable emergency alarm.

2. The communication device of claim (1) wherein: the communication device determines the location by any dependable and available system including at least one of: Global Positioning System (GPS), Assisted Global Positioning System (AGPS), Base Station Positioning System, or Radio-Frequency Identification System (RFID).

3. The communication device of claim (2) wherein: the communication device delivers the text or voice message to a preset number of contacts in a preset order or preset cycle.

4. The communication device of claim (3) wherein: the text or voice message includes preset contents of communication.

5. The communication device of claim (4) wherein: the communication device includes a unit capable of producing a noticeable emergency signal, which is ceased when a response is received by the communication device which then switches to a ringtone or talk mode.

6. The communication device of claim (5) wherein: if the communication device is in a stand-by mode, it will enter a working mode when the emergency system is initiated.

7. The communication device of claim (1) wherein: when the communication device cannot determine the location and the communication device is not turned off in the set period of time, the communication device will deliver a text or voice message to a preset number of contacts on the contact list at least one person that is preset in the communication device in a preset order or preset cycle, produce a noticeable emergency notifier, or switch to a talk mode.

8. The communication device of claim (1) wherein: the communication device includes a reading unit that reads a recordable medium to execute the procedure of sending emergency messages.

9. A non-transitory electronically or machine readable recordable medium, which is read by a communication device and retains instructions which when notified of an emergency, cause the communication device to execute a positioning procedure, convert the current location into a text or voice message, and deliver the text or voice message to at least one person on a contact list that is preset in the medium;
wherein the non-transitory electronically or machine readable recordable medium further retains instructions that cause the communication device to continue producing a noticeable emergency alarm when the communication device cannot determine the location and the communication device is not turned off in a set period of time.

10. The non-transitory readable recordable medium of claim (9) wherein: the location is determined by any dependable and available system including at least one of: Global Positioning System (GPS), Assisted Global Positioning System (AGPS), Base Station Positioning System, or Radio-Frequency Identification System (RFID).

11. The non-transitory readable recordable medium of claim (10) wherein: the text or voice message is delivered to a preset number of contacts in a preset order or preset cycle.

12. The non-transitory readable recordable medium of claim (11) wherein: the text or voice message includes preset contents of communication.

13. A method of sending an emergency message, when in a state of emergency, a user activates or initiates a communication device to execute a positioning procedure, to convert a current location into a text or voice message, and to deliver the text or voice message to at least one person on a contact list that is preset in the communication device;
wherein in the event that the communication device cannot determine the location and the communication device is not turned off in a set period of time, the communication device will maintain a prior-initiated noticeable emergency alarm.

14. The method of claim (13) wherein: the communication device determines the location by any dependable and available system including at least one of:
Global Positioning System (GPS), Assisted Global Positioning System (AGPS), Base Station Positioning System, or Radio-Frequency Identification System (RFID).

15. The method of claim (14) wherein: the text or voice message can be delivered to a preset number of contacts in a preset order or preset cycle.

16. The method of claim (15) wherein: the text or voice message includes preset contents of communication.

17. The method of claim (16) wherein: the communication device initiates a noticeable emergency signal which is ceased when a response is received by the communication device which then switches to a ringtone or talk mode.

18. The method of claim (17) wherein: if the communication device is in a stand-by mode, it will enter a working mode when the emergency system generation is initiated.

19. The method of claim (13) wherein: the communication device determines if the positioning procedure is successfully performed.

20. The method of claim (13) wherein: in the event that the communication device cannot determine the location and the communication device is not turned off in the set period of time, the communication device will deliver a text or voice message to at least one person on the contact list that is preset in the communication device to a preset number of contacts in a preset order or preset cycle, initiate or maintain a noticeable emergency notifier, or switch to a talk mode.

21. The method of claim (13) wherein: the communication device is any receive-send device, including a cellular phone.

22. The non-transitory electronically or machine readable recordable medium of claim (9), further retaining instructions that, when the communication device cannot determine the location and the communication device is not turned off in the set period of time, cause the communication device to:
deliver a text or voice message to a preset number of contacts on the contact list that is preset in the communication device in a preset order or preset cycle;
produce a noticeable emergency notifier; or
switch to a talk mode.

* * * * *

UNITED STATES PATENT AND TRADEMARK OFFICE
CERTIFICATE OF CORRECTION

| | | |
|---|---|---|
| PATENT NO. | : 8,600,342 B2 | Page 1 of 1 |
| APPLICATION NO. | : 12/691825 | |
| DATED | : December 3, 2013 | |
| INVENTOR(S) | : Chang-Shan Chuang et al. | |

It is certified that error appears in the above-identified patent and that said Letters Patent is hereby corrected as shown below:

On the title page of the original Letters Patent document, the spelling of item (73) the Assignee name is incorrectly listed as Chii Yang Co., Ltd.

The correct spelling should be

Chii Ying Co., Ltd.

Signed and Sealed this
Twenty-first Day of April, 2015

Michelle K. Lee
*Director of the United States Patent and Trademark Office*